HEAT-RESISTANT HIGH-STRENGTH STAINLESS STEEL

Original Filed Oct. 5, 1961

4 Sheets-Sheet 1

INVENTORS
August Kasak
Edward J. Dulis
VIJAY K. Chandhok

BY John R. Regan
ATTORNEY

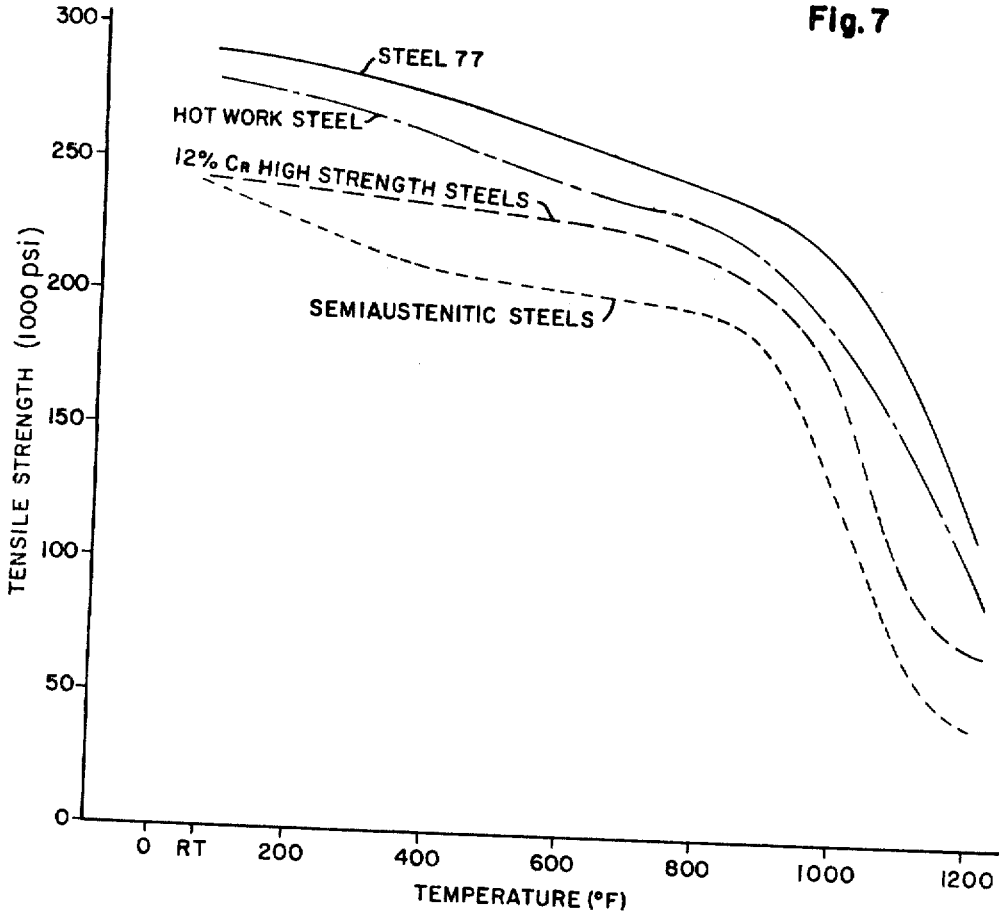
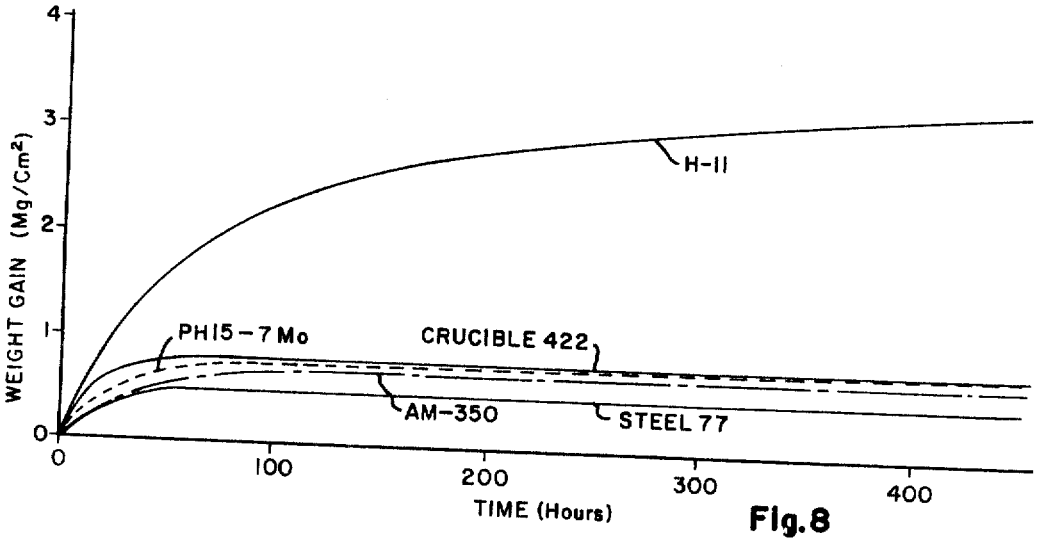
Fig. 8

United States Patent Office

Re. 26,225

Reissued June 20, 1967

26,225

HEAT-RESISTANT HIGH-STRENGTH STAINLESS STEEL

August Kasak, Bridgeville, and Edward J. Dulis and Vijay K. Chandhok, Pittsburgh, Pa., assignors to Crucible Steel Company of America, Pittsburgh, Pa., a corporation of New Jersey Original No. 3,154,412, dated Oct. 27, 1964, Ser. No. 143,157, Oct. 5, 1961. Application for reissue Oct. 26, 1966, Ser. No. 596,035

9 Claims. (Cl. 75—126)

Matter enclosed in heavy brackets [ ] appears in the original patent but forms no part of this reissue specification; matter printed in italics indicates the additions made by reissue.

This invention pertains to stainless steel and particularly to stainless steel exhibiting very high strength at room and elevated temperatures. More particularly, the invention pertains to stainless steel having very high strength and exhibiting good oxidation and corrosion resistance under substantially atmospheric conditions at both ambient and elevated temperatures.

Concerning the various steels of the prior art, those known as austenitic stainless steels may be characterized as resistant to corrosion and oxidation and as having good strength at elevated temperatures. A disadvantage of such steels, however, is their relatively low strength at ambient and moderately elevated temperatures. On the other hand, some steels of a heat-treatable nature and having a martensitic structure attain desired high strengths at ambient temperature which are retained at elevated temperatures. Exemplary of such steels are those covered by U.S. Patent No. 2,986,463, issued May 30, 1961, which was copending herewith. These steels, however are not characterized by good resistance to corrosion and oxidation. Other martensitic steels having chromium contents of about 12% by weight have improved corrosion and oxidation resistance while similarly exhibiting relatively good strength at low temperatures and fairly high strength at elevated temperatures. The latter martensitic steels however, are limited in chromium content to a maximum value of about 12%. Above this value, the microstructure of the steel is characterized by the presence of substantial amounts of free ferrite. Free ferrite in substantial amounts is undesirable, being generally regarded as the probable cause of many hot-working difficulties as well as excessive variations in product properties with regard to the direction of working.

Another group of heat-treatable stainless steels, the so-called semiaustenitic steels, have chromium contents up to about 17%, but their applicability at temperatures above about 900° to 1000° F. is very limited. At such temperatures, particularly after prolonged exposure, these steels have relatively low strength values.

In accordance with a principal object of the present invention, steels are provided which are heat-treatable to very high strength levels and which retain an unusually high percentage of such strength at temperatures up to 1200° F. or higher. These steels offer particularly high strengths, in both short-time and prolonged exposures, at temperatures ranging from about 1000° to 1200° F. and in addition exhibit high resistance to corrosion and oxidation. The inventive steels constitute a substantial improvement over the elevated-temperature structural materials known to the art and are particularly well suited for construction of aircraft and engine parts subjected to wide variations in operating temperatures.

The steels of the invention comprise iron-base alloys of the following broad composition ranges:

| | Percent |
|---|---|
| Carbon | 0.01 to 0.25 |
| Nitrogen | 0.01 to 0.25 |
| Sum of carbon and nitrogen | 0.06 to 0.35 |
| Manganese | Up to 1.0 |
| Silicon | Up to 1.0 |
| Chromium | 11 to 16 |
| Vanadium | Up to 1.0 |
| Molybdenum | Up to 10 |
| Tungsten | Up to 10 |
| Sum of molybdenum and tungsten | 3.5 to 20 |
| Cobalt | 10 to 20 |
| Aluminum | Up to 0.25 |
| Boron | Up to 0.025 |

Preferred composition ranges of the inventive steels are as follows:

| | | |
|---|---|---|
| Carbon | 0.05 to 0.17% | 0.08 to 0.17%. |
| Nitrogen | 0.01 to 0.07% | 0.05 to 0.15%. |
| Sum of Carbon and Nitrogen | 0.10 to 0.20% | 0.20 to 0.30%. |
| Manganese | 0.10 to 0.40% | 0.10 to 0.40%. |
| Silicone | 0.10 to 0.40% | 0.10 to 0.40%. |
| Chromium | 12.0 to 16.0% | 12.0 to 16.0%. |
| Vanadium | Up to 1.0% | Up to 1.0%. |
| Molybdenum | 4.0 to 6.0% | 4.0 to 6.0%. |
| Tungsten | Up to 5.0% | Up to 5.0%. |
| Cobalt | 12.0 to 15.0% | 10.0 to 12.0%. |

In addition to the elements listed in the above broad and preferred composition ranges, the steels may contain impurities commonly encountered in the steelmaking practice (such as sulfur and phosphorus) and "tramp" elements.

The steels of this invention are typified by Steels 77 and 107, the chemical compositions of which, together with those of a sizeable number of steels of similar compositions are given in Tables I–A and I–B. Table I–A lists these steels according to significant compositional variable, whereas Table I–B lists the same steels according to identification number. Microstructural characteristics of the steels are determined by microstructural examination and mechanical properties of the steels as determined by hardness, tension, and creep-rupture tests are set forth in Tables II through VI.

TABLE I–A

Chemical compositions of steels investigated [1]

| Steel | C | Cr | V | Mo | Co | N | Al | Other |
|---|---|---|---|---|---|---|---|---|
| 121 | **0.014** | 14.16 | <.01 | 5.38 | 13.43 | 0.054 | ------ | |
| 116 | **0.023** | 14.48 | 0.46 | 4.99 | 13.56 | 0.016 | 0.040 | |
| 115 | **0.06** | 14.48 | 0.48 | 4.96 | 13.56 | 0.016 | 0.050 | |
| 91 | **0.08** | 14.48 | 0.46 | 4.99 | 13.56 | 0.071 | 0.033 | |
| 92 | **0.12** | 14.40 | 0.41 | 4.99 | 13.45 | 0.028 | 0.046 | |
| 95 | **0.15** | 14.60 | 0.41 | 5.02 | 13.48 | 0.022 | 0.046 | |
| 77 | **0.16** | 14.36 | 0.48 | 4.90 | 13.60 | 0.05 | 0.042 | |
| 93 | **0.21** | 14.52 | 0.43 | 5.09 | 13.48 | 0.025 | 0.033 | |
| 94 | **0.21** | 14.58 | 0.46 | 5.02 | 13.45 | 0.018 | 0.046 | |
| 77 | 0.16 | **14.36** | 0.48 | 4.90 | 13.60 | 0.05 | 0.042 | |
| 97 | 0.145 | **15.54** | 0.41 | 4.99 | 13.41 | 0.03 | 0.033 | |
| 98 | 0.16 | **16.20** | 0.41 | 5.09 | 13.41 | 0.03 | 0.067 | |
| 99 | 0.16 | 14.36 | **0.0** | 5.15 | 13.45 | 0.028 | 0.067 | |
| 95 | 0.15 | 14.60 | **0.41** | 5.02 | 13.48 | 0.022 | 0.046 | |
| 77 | 0.16 | 14.36 | **0.48** | 4.90 | 13.60 | 0.05 | 0.042 | |
| 100 | 0.16 | 14.34 | **0.87** | 5.09 | 13.45 | 0.038 | 0.050 | |
| 103 | 0.16 | 14.36 | **0.41** | **3.04** | 13.64 | 0.026 | 0.025 | |
| 101 | 0.157 | 14.36 | **0.97** | **3.01** | 13.33 | 0.025 | 0.054 | |
| 102 | 0.146 | 13.72 | 0.41 | **0.15** | 13.11 | 0.025 | 0.084 | |
| 103 | 0.16 | 14.36 | 0.41 | **3.04** | 13.64 | 0.026 | 0.025 | |
| 77 | 0.16 | 14.36 | 0.48 | **4.90** | 13.60 | 0.05 | 0.042 | |
| 104 | 0.166 | 14.24 | 0.41 | **7.15** | 13.60 | 0.026 | 0.042 | |
| 111 | 0.17 | 13.98 | 0.46 | 5.09 | **0.02** | 0.057 | 0.037 | |
| 112 | 0.155 | 14.04 | 0.43 | 4.96 | **3.98** | 0.032 | 0.084 | |
| 113 | 0.15 | 14.04 | 0.43 | 4.99 | **8.03** | 0.03 | 0.084 | |
| 76 | 0.155 | 14.26 | 0.46 | 4.93 | **10.55** | 0.03 | 0.042 | |
| 106 | 0.154 | 14.36 | 0.41 | 5.09 | **12.23** | 0.03 | 0.042 | |
| 77 | 0.16 | 14.36 | 0.48 | 4.90 | **13.60** | 0.05 | 0.042 | |
| 78 | 0.155 | 13.56 | 0.40 | 4.70 | **16.20** | 0.04 | 0.042 | |
| 67 | 0.15 | 14.02 | 0.38 | 4.83 | **18.70** | 0.02 | 0.046 | |
| 115 | 0.06 | 14.48 | 0.48 | 4.96 | 13.56 | **0.016** | 0.050 | |
| 91 | 0.08 | 14.48 | 0.46 | 4.99 | 13.56 | **0.07** | 0.033 | |
| 96 | 0.07 | **14.48** | 0.46 | 5.06 | 13.49 | **0.15** | 0.046 | |
| 107 | 0.164 | 14.40 | 0.41 | 5.28 | **11.74** | **0.13** | 0.042 | |
| 89 | 0.17 | 14.48 | 0.41 | 5.22 | **11.41** | **0.12** | **0.13** | |
| 77 | 0.16 | 14.36 | 0.48 | 4.90 | 13.60 | 0.05 | 0.042 | 0 W. |
| 75 | 0.177 | 13.44 | 0.46 | **3.01** | **19.46** | 0.04 | 0.042 | **2.35 W.** |
| 122 | 0.162 | 14.50 | 0.52 | **0.04** | 13.21 | 0.04 | ------ | **5.11 W.** |
| 105 | 0.154 | 14.26 | 0.41 | 5.09 | 13.64 | 0.033 | 0.025 | **0.007 B.** |
| 118 | 0.15 | 14.56 | 0.48 | 5.34 | **0.02** | 0.023 | ------ | **3.32 Ni.** |
| 120 | 0.144 | 13.80 | 0.43 | 5.25 | **0.02** | 0.022 | ------ | **7.52 Ni.** |
| 114 | 0.167 | 14.46 | 0.46 | 5.09 | **0.04** | 0.037 | 0.084 | **10.14 Ni.** |
| 108 | 0.164 | 14.46 | 0.41 | 5.12 | 13.41 | 0.026 | 0.046 | **0.36 Mn.** |
| 109 | 0.161 | 14.50 | 0.41 | 5.09 | 13.41 | 0.024 | 0.037 | **0.67 Si.** |
| 110 | 0.16 | 14.64 | 0.43 | 5.12 | 13.41 | 0.037 | 0.037 | **0.51 Mn.** **0.79 Si.** |

[1] Grouped according to significant compositional variable; the significant compositional variable or variables are [italicized] *in bold face type.*

TABLE I–B

Chemical compositions of steels investigated [1]

| Steel | C | Cr | V | Mo | Co | N | Al | Other |
|---|---|---|---|---|---|---|---|---|
| 67 | 0.15 | 14.02 | 0.38 | 4.83 | **18.70** | 0.02 | 0.046 | |
| 75 | 0.177 | 13.44 | 0.46 | **3.01** | **19.46** | 0.04 | 0.042 | **2.35 W.** |
| 76 | 0.155 | 14.26 | 0.46 | 4.93 | **10.55** | 0.03 | 0.042 | |
| 77 | **0.16** | **14.36** | **0.48** | **4.90** | **13.60** | 0.05 | 0.042 | |
| 78 | 0.155 | 13.56 | 0.40 | 4.70 | **16.20** | 0.04 | 0.042 | |
| 89 | 0.17 | 14.48 | 0.41 | 5.22 | **11.41** | **0.12** | 0.13 | |
| 91 | **0.08** | 14.48 | 0.46 | 4.99 | 13.56 | 0.071 | 0.033 | |
| 92 | **0.12** | 14.40 | 0.41 | 4.99 | 13.45 | 0.028 | 0.046 | |
| 93 | **0.21** | 14.52 | 0.43 | 5.09 | 13.48 | 0.025 | 0.033 | |
| 94 | **0.21** | 14.58 | 0.46 | 5.02 | 13.45 | 0.018 | 0.046 | |
| 95 | **0.15** | 14.60 | **0.41** | 5.02 | 13.48 | 0.022 | 0.046 | |
| 96 | 0.07 | 14.48 | 0.46 | 5.06 | 13.49 | **0.15** | 0.046 | |
| 97 | 0.145 | **15.54** | 0.41 | 4.99 | 13.41 | 0.03 | 0.033 | |
| 98 | 0.16 | **16.20** | 0.41 | 5.09 | 13.41 | 0.03 | 0.067 | |
| 99 | 0.16 | 14.36 | **0.0** | 5.15 | 13.45 | 0.028 | 0.067 | |
| 100 | 0.16 | 14.34 | **0.87** | 5.09 | 13.45 | 0.038 | 0.050 | |
| 101 | 0.157 | 14.36 | **0.97** | **3.01** | 13.33 | 0.025 | 0.054 | |
| 102 | 0.146 | 13.72 | 0.41 | **0.15** | 13.11 | 0.025 | 0.084 | |
| 103 | 0.16 | 14.36 | **0.41** | **3.04** | 13.64 | 0.026 | 0.025 | |
| 104 | 0.166 | 14.24 | 0.41 | **7.15** | 13.60 | 0.026 | 0.042 | |
| 105 | 0.154 | 14.26 | 0.41 | 5.09 | 13.64 | 0.033 | 0.025 | **0.007 B.** |
| 106 | 0.154 | 14.36 | 0.41 | 5.09 | **12.23** | 0.03 | 0.042 | |
| 107 | 0.164 | 14.40 | 0.41 | 5.28 | **11.74** | **0.13** | **0.042** | |
| 108 | 0.164 | 14.46 | 0.41 | 5.12 | 13.41 | 0.026 | 0.046 | **0.36 Mn.** |
| 109 | 0.161 | 14.50 | 0.41 | 5.09 | 13.41 | 0.024 | 0.037 | **0.67 Si.** |
| 110 | 0.16 | 14.64 | 0.43 | 5.12 | 13.41 | 0.037 | 0.037 | **0.51 Mn.** **0.79 Si.** |
| 111 | 0.17 | 13.98 | 0.46 | 5.09 | **0.02** | 0.057 | 0.037 | |
| 112 | 0.155 | 14.04 | 0.43 | 4.96 | **3.98** | 0.032 | 0.084 | |
| 113 | 0.15 | 14.04 | 0.43 | 4.99 | **8.03** | 0.03 | 0.084 | |
| 114 | 0.167 | 14.46 | 0.46 | 5.09 | **0.04** | 0.037 | 0.084 | **10.14 Ni.** |
| 115 | **0.06** | 14.48 | 0.48 | 4.96 | 13.56 | **0.016** | 0.050 | |
| 116 | **0.023** | 14.48 | 0.46 | 4.99 | 13.56 | 0.016 | 0.040 | |
| 118 | 0.15 | 14.56 | 0.48 | 5.34 | **0.02** | 0.023 | ------ | **3.32 Ni.** |
| 120 | 0.144 | 13.80 | 0.43 | 5.25 | **0.02** | 0.022 | ------ | **7.52 Ni.** |
| 121 | **0.014** | 14.16 | <.01 | 5.38 | 13.43 | 0.054 | ------ | |
| 122 | 0.162 | 14.50 | 0.52 | **0.04** | 13.21 | 0.04 | ------ | **5.11 W.** |

[1] Steels listed in numerical order.

TABLE II

Results of microstructural examination and hardness tests [1]

| Steel | Austenitized at 1,900° F. | | | Austenitized at 2,000° F. | | |
|---|---|---|---|---|---|---|
| | Free Ferrite (percent) | Hardness ($R_c$) after Tempering 2+2 hr. at: | | Free Ferrite (percent) | Hardness ($R_c$) after Tempering 2+2 hr. at: | |
| | | 1,100° F. | 1,200° F. | | 1,100° F. | 1,200° F. |
| 67 | 0 | 48 | 48 | 0 | 48 | 48 |
| 75 | 0 | 52 | 49 | 0 | 49 | 50 |
| 76 | 5 | 51 | 44 | 10 | 52 | 46 |
| 77 | 0 | 53 | 47 | 0 | 54 | 47 |
| 78 | 0 | 54 | 49 | 0 | 55 | 49 |
| 89 | 0 | 54 | 50 | 1–5 | 56 | 53 |
| 91 | <1 | 54 | 48 | 0–1 | 54 | 51 |
| 92 | <1 | 53 | 47 | 0–1 | 53 | 49 |
| 93 | 0 | 53 | 47 | 0 | 55 | 50 |
| 94 | 0 | 53 | 47 | 0 | 56 | 51 |
| 95 | 0 | 53 | 47 | 1 | 54 | 50 |
| 96 | 0 | 54 | 50 | 0 | 54 | 52 |
| 97 | 0 | 52 | 49 | 5 | 53 | 49 |
| 98 | 10 | 52 | 48 | 30 | 41 | 41 |
| 99 | 0 | 53 | 48 | 0 | 54 | 50 |
| 100 | <1 | 53 | 47 | 10 | 55 | 51 |
| 101 | 0 | 47 | 40 | 0 | 47 | 41 |
| 102 | 0 | 36 | 33 | 0 | 36 | 34 |
| 103 | 0 | 47 | 39 | 0 | 46 | 42 |
| 104 | 0 | 55 | 49 | 25 | 56 | 53 |
| 105 | 0 | 53 | 47 | 0 | 55 | 50 |
| 106 | 1 | 51 | 46 | 5 | 53 | 48 |
| 107 | 0 | 54 | 49 | 0 | 56 | 51 |
| 108 | 0 | 49 | 49 | 1–5 | 55 | 49 |
| 109 | 0 | 49 | 49 | 1 | 57 | 52 |
| 110 | 0 | 51 | 52 | 0 | 41 | 50 |
| 111 | 100 | 18 | 17 | 90 | 24 | 23 |
| 112 | 50 | 35 | 33 | 50 | 36 | 37 |
| 113 | 30 | 44 | 43 | 30 | 49 | 43 |
| 114 | 0 | $R_b$, 87 | $R_b$, 89 | 0 | $R_b$, 84 | $R_b$, 83 |
| 115 | 20 | 50 | 46 | 30 | 51 | 47 |
| 116 | 30 | 48 | 44 | 40 | 47 | 43 |
| 118 | 50 | 38 | 35 | 50 | 41 | 37 |
| 120 | 0 | $R_b$, 92 | $R_b$, 92 | 5 | $R_b$, 87 | $R_b$, 85 |
| 121 | 0 | 50 | 44 | 20 | 50 | 45 |
| 122 | 0 | 49 | 45 | 0 | 50 | 46 |

[1] Heat treatment: Austenitized at the indicated temperature (1,900° or 2,000° F.), oil quenched, refrigerated at −100° F. for ½ hr., and tempered at 1,100° F. for 2+2 hr.

TABLE III

Results of tension tests at room temperature [1]

| Steel | Austenitizing Temperature (° F.) | 0.2% Offset Yield Strength (1,000 p.s.i.) | Tensile Strength (1,000 p.s.i.) | Elong. in 1 inch (Percent) | Reduction of Area (Percent) |
|---|---|---|---|---|---|
| 67 | 1,900 | 126 | 259 | 10 | 32 |
| 75 | 1,900 | 163 | 280 | 8 | 16 |
| 76 | 2,000 | 204 | 275 | 14 | 49 |
| 77 | 1,900 | 214 | 289 | 9 | 27 |
| | 2,000 | 222 | 294 | 14 | 36 |
| 78 | 2,000 | 185 | 283 | 12 | 39 |
| 89 | 2,000 | 223 | 310 | 10 | 38 |
| 91 | 1,900 | 188 | 292 | 12 | 35 |
| | 2,000 | 192 | 294 | 16 | 51 |
| | 2,100 | 191 | 292 | 12 | 34 |
| 92 | 2,000 | 192 | 288 | 16 | 49 |
| 93 | 2,000 | 229 | 305 | 6 | 12 |
| 94 | 2,000 | 222 | 306 | 12 | 33 |
| 95 | 2,000 | 204 | 308 | 12 | 46 |
| 96 | 2,000 | 169 | 295 | 4 | 5 |
| 97 | 1,900 | 186 | 285 | 9 | 32 |
| | 2,000 | 195 | 299 | 14 | 46 |
| 99 | 2,000 | 212 | 300 | 12 | 43 |
| 100 | 2,000 | 225 | 308 | 12 | 45 |
| 101 | 2,000 | 180 | 232 | 14 | 44 |
| 102 | 2,000 | 144 | 164 | 16 | 44 |
| 103 | 2,000 | 179 | 234 | 14 | 43 |
| 104 | 2,000 | 212 | 319 | 4 | 6 |
| 105 | 2,000 | 218 | 304 | 11 | 40 |
| 106 | 1,900 | 209 | 274 | 12 | 41 |
| | 2,000 | 218 | 289 | 13 | 49 |
| 107 | 2,000 | 239 | 312 | 10 | 38 |
| 108 | 2,000 | 196 | 296 | 12 | 44 |
| 109 | 2,000 | 205 | 309 | 4 | 6 |

[1] Heat treatment: Austenitized at the indicated temperature, oil quenched, refrigerated at −100° F. ½ hr., and tempered at 1,100° F. 2+2 hr.

TABLE IV

Results of Tension Tests at 1100° F.[1]

| Steel | Austenitizing Temperature (° F.) | 0.2% Offset Yield Strength (1,000 p.s.i.) | Tensile Strength (1,000 p.s.i.) | Elong. in 1 inch (Percent) | Reduction of Area (Percent) |
|---|---|---|---|---|---|
| 77 | 2,000 | 123 | 180 | 19 | 52 |
| 89 | 2,000 | 142 | 194 | 19 | 52 |
| 91 | 2,000 | 132 | 180 | 23 | 67 |
| | 2,100 | 120 | 177 | 19 | 59 |
| 92 | 2,000 | 132 | 176 | 23 | 66 |
| 93 | 2,000 | 120 | 185 | 16 | 51 |
| 94 | 2,000 | 122 | 186 | 18 | 53 |
| 95 | 2,000 | 117 | 186 | 24 | 66 |
| 96 | 2,000 | 121 | 182 | 12 | 41 |
| 97 | 2,000 | 120 | 176 | 17 | 63 |
| 99 | 2,000 | 127 | 182 | 18 | 42 |
| 100 | 2,000 | 140 | 191 | 19 | 61 |
| 101 | 2,000 | 106 | 140 | 20 | 68 |
| 102 | 2,000 | 73 | 89 | 25 | 71 |
| 103 | 2,000 | 103 | 139 | 26 | 69 |
| 104 | 2,000 | 125 | 194 | 14 | 43 |
| 105 | 2,000 | 139 | 189 | 16 | 46 |
| 106 | 1,900 | 124 | 163 | 16 | 57 |
| | 2,000 | 128 | 174 | 20 | 67 |
| 107 | 2,000 | 144 | 197 | 16 | 51 |
| 108 | 2,000 | 138 | 182 | 25 | 67 |
| 109 | 2,000 | 135 | 188 | 22 | 65 |
| 110 | 2,000 | 137 | 190 | 21 | 58 |

[1] Heat treatment: Austenitized at the indicated temperature, oil quenched, refrigerated at −100° F. ½ hr., and tempered at 1,100° F. 2+2 hr.

TABLE V

Results of Creep-Rupture Tests at 1100° F.[1]

| Steel | Aust. Temp. (° F.) | Stress (p.s.i.) | Rupture | | |
|---|---|---|---|---|---|
| | | | Life (hr.) | Elong. (percent) | Red. of Area (percent) |
| 67 | 2,000 | 75,000 | 112 | 8 | 11 |
| 75 | 1,900 | 75,000 | 239 | 8 | 10 |
| | 2,000 | [2] 75,000 | 365 | 5 | 9 |
| 76 | 2,000 | 75,000 | 224 | 17 | 51 |
| | 2,100 | 75,000 | 195 | 13 | 35 |
| 77 | 1,900 | 75,000 | 221 | 13 | 31 |
| | 1,900 | 90,000 | 137 | 21 | 47 |
| | 2,000 | 75,000 | 366 | 8 | 14 |
| | 2,000 | 90,000 | 194 | 13 | 15 |
| | 2,100 | 75,000 | 406 | 4 | 7 |
| 78 | 2,000 | 75,000 | 243 | 5 | 8 |
| | 2,100 | 75,000 | 259 | 3 | 8 |
| 89 | 2,000 | 75,000 | 620 | 9 | 9 |
| | 2,000 | 90,000 | 308 | 11 | 11 |
| 91 | 1,900 | 75,000 | 296 | 13 | 16 |
| | 2,000 | 75,000 | 369 | 7 | 12 |
| | 2,100 | 75,000 | 275 | 5 | 11 |
| 92 | 2,000 | 75,000 | 214 | 12 | 23 |
| 93 | 2,000 | 75,000 | 269 | 11 | 21 |
| 94 | 2,000 | 75,000 | 224 | 9 | 22 |
| 95 | 2,000 | 75,000 | 259 | 8 | 15 |
| 96 | 2,000 | 75,000 | 242 | 7 | 13 |
| 97 | 1,900 | 75,000 | 109 | 12 | 30 |
| | 2,000 | 75,000 | 254 | 11 | 20 |
| 99 | 2,000 | 75,000 | 189 | 11 | 27 |
| 100 | 2,000 | 75,000 | 274 | 13 | 26 |
| 101 | 2,000 | 75,000 | 75 | 19 | 55 |
| 102 | 2,000 | 75,000 | 0.1 | 21 | 61 |
| 103 | 2,000 | 75,000 | 115 | 21 | 49 |
| 104 | 2,000 | 75,000 | 212 | 13 | 30 |
| 105 | 2,000 | 75,000 | 276 | 5 | 8 |
| 106 | 1,900 | 75,000 | 185 | 20 | 55 |
| 107 | 2,000 | 75,000 | 694 | 8 | 14 |
| 109 | 2,000 | 75,000 | 257 | 11 | 28 |
| 110 | 2,000 | 75,000 | 338 | 11 | 17 |
| 122 | 2,000 | 75,000 | 782 | 5 | 7 |

[1] Heat treatment: Austenitized at the indicated temperature, oil quenched, refrigerated at −100° F. ½ hr., and tempered at 1,100° F. for 2+2 hr.

[2] Heat treatment: Austenitized at the indicated temperature, oil quenched, refrigerated at −100° F. ½ hr., and tempered at 1,100° F. for 2+2+2+2 hr.

TABLE VI

Results of Creep-Rupture Tests at 1200° F. Under a Stress or 35,000 p.s.i.[1]

| Steel | Aust. Temp. ° F. | Rupture | | |
|---|---|---|---|---|
| | | Life (hr.) | Elong. (percent) | Red. of Area (percent) |
| 75 | 2,000 | 96 | 13 | 13 |
| 76 | 2,000 | 148 | 16 | 26 |
| 77 | 2,000 | 103 | 18 | 17 |
| 78 | 2,000 | 76 | 16 | 24 |
| 89 | 2,000 | 94 | 11 | 11 |
| 91 | 1,900 | 63 | 32 | 50 |
| | 2,000 | 135 | 21 | 28 |
| | 2,100 | 109 | 25 | 33 |
| 92 | 2,000 | 65 | 27 | 27 |
| 93 | 2,000 | 63 | 17 | 22 |
| 94 | 2,000 | 66 | 51 | 47 |
| 95 | 2,000 | 75 | 16 | 19 |
| 96 | 2,000 | 69 | 9 | 9 |
| 97 | 1,900 | 21 | 29 | 54 |
| | 2,000 | 73 | 32 | 43 |
| 99 | 2,000 | 84 | 7 | 12 |
| 100 | 2,000 | 56 | 21 | 39 |
| 101 | 2,000 | 27 | 16 | 21 |
| 102 | 2,000 | 6 | 19 | 31 |
| 103 | 2,000 | 36 | 8 | 19 |
| 104 | 2,000 | 72 | 43 | 38 |
| 105 | 2,000 | 103 | 11 | 15 |
| 106 | 1,900 | 54 | 42 | 53 |
| | 2,000 | 98 | 13 | 28 |
| 107 | 2,000 | 146 | 16 | 17 |
| 108 | 2,000 | 76 | 22 | 24 |
| 109 | 2,000 | 82 | 27 | 38 |
| 110 | 2,000 | 101 | 25 | 33 |
| 122 | 2,000 | 175 | 11 | 13 |

[1] Heat treatment: Austenitized at the indicated temperature, oil quenched, refrigerated at −100° F. ½ hr., and tempered at 1100° F. for 2+2 hr.

Graphical illustrations of the foregoing, as well as graphical comparisons of the steel of the invention with prior-art steels, are depicted by the drawings, wherein;

FIG. 7 shows the tensile strength of various prior-art steels together with that of a steel typical of the invention;

FIG. 8 shows the oxidation resistance of various prior-art steels together with that of a steel typical of the invention.

Figure 1:
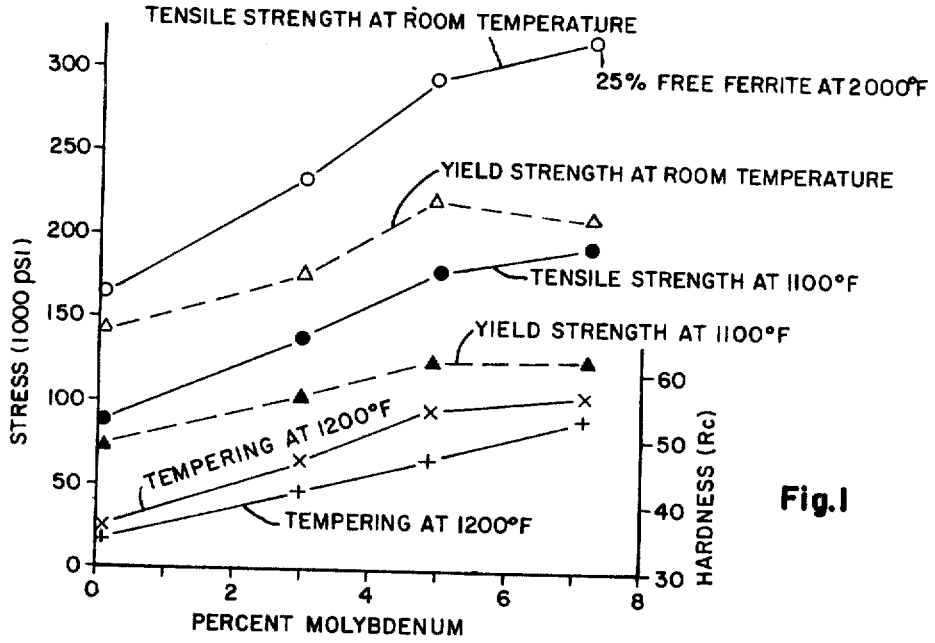
FIG. 1 shows the effect of molybdenum on tensile properties and hardness.

As indicated by the test data set out in the aforementioned tables and drawings, steels within the invention are capable of exhibiting hardness of Rockwell "C" 48 or greater and tensile strength of 250,000 p.s.i. or greater at room temperature, tensile strength of 170,000 p.s.i. or greater at a temperature of 1100° F., creep-rupture life of 100 hours or more for an applied stress of 75,000 p.s.i. at a temperture of 1100° F., and creep-rupture life of 50 hours or more for an applied stress of 35,000 p.s.i. at a temperature of 1200° F. In addition to exhibiting superior strength properties the steels of the invention exhibit good ductility at both room and elevated temperatures and have excellent weldability.

In accordance with the basic concepts of the present invention, the foregoing superior mechanical properties are obtained only upon the achievement of a proper compositional balance and the application of a proper heat treatment. Such heat treatment may involve the steps of austenitizing at an elevated temperature, preferably in the range of 1900° to 2100° F., cooling to room temperature, and heating at an elevated temperature below about 1500° F. Refrigeration at a subzero temperature, e.g. −100° F., is preferably included in the heat-treating schedule immediately following the austenitizing step for the purpose of facilitating the transformation of austenite. While the recited sequence of heat-treating steps has been found admirably suited for the contemplated purpose, it is well to note that other sequences of heat-treating steps, including conditioning treatments, may be employed, the principal criteria being the complete or substantially complete elimination of free ferrite at elevated temperatures and the complete or substantially complete elimination of austenite thereafter as well as the obtention of high strength.

It is also understood that a combination of thermal and mechanical treatments may result in further improvement of some of the important properties of the inventive steels. For example, when a sheet sample of Steel 77 was cold reduced 50% in thickness and subsequently heated at 1100° F. for two plus two hours, a tensile strength of 341,000 p.s.i. and an elongation of 6% were obtained at room temperature. In contrast, it will be noted from Table III that thermal treatment alone of Steel 77 resulted in a maximum tensile strength of only 294,000 p.s.i.

It is well known to the art that in order for a steel to exhibit satisfactory corrosion resistance at ambient temperature and satisfactory oxidation resistance at temperatures up to about 1200° F., the chromium content of such steel should be about 12% or more. In general, the higher the chromium content of the steel, the higher its corrosion and oxidation resistance. In view of these considerations, chromium has been included as an essential element in the steels of the invention, the minimum content thereof being set at 11%. As it is desirable to maintain the chromium content at the highest level compatible with desired microstructural characteristics, i.e., essential freedom from free ferrite and retained austenite, the maximum chromium content of the inventive steels has been set at about 16%. The latter figure finds support in the accompanying data wherein it is observed from Tables I–A and II that when the compositional variable is chromium, values of 14.36% (Steel 77) and 15.54% (Steel 97) result in a microstructure having no free ferrite after an austenitizing treatment at 1900° F., whereas, a value of 16.20% (Steel 98) results in a microstructure having 10% free ferrite after the same austenitizing treatment.

Figure 2:
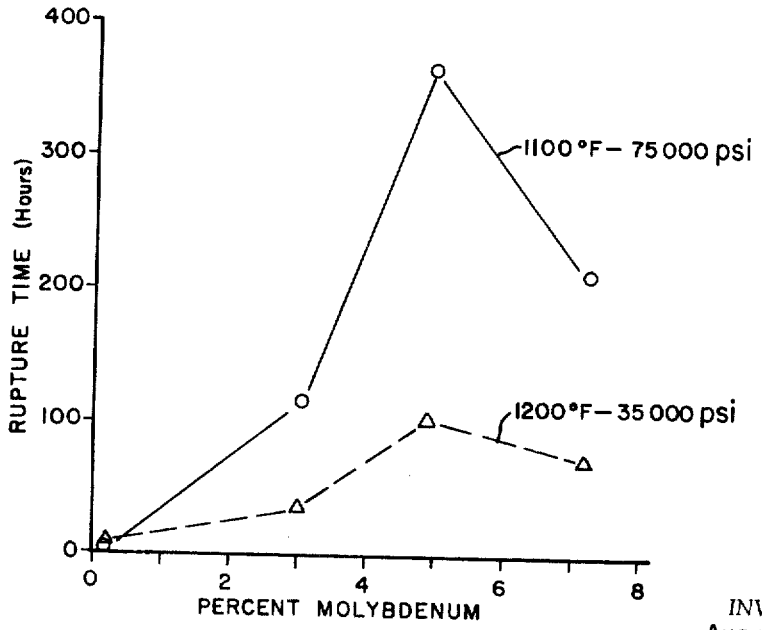
FIG. 2 shows the effect of molybdenum on creep-rupture strength.

Molybdenum has been included in the steels of the invention as an effective strengthener. Supporting data therefor were obtained by testing steels of the basic inventive composition wherein the molybdenum content was varied (see Table I–A, Steels 102, 103, 77 and 104). As shown in FIGS. 1 and 2, all the important strength properties, i.e., yield and tensile strengths at room temperature and at 1100° F., hardness after tempering at 1100° F. and 1200° F., and rupture times in creep-rupture tests at 1100° F. and 1200° F., are steadily enhanced as the molybdenum content is increased from about 0.1 to about 5%. Tables III through VI indicate that for this same molybdenum range, ductility is maintained at a high level. Molybdenum contents in excess of about 5% have some additional strengthening effects in short-time tests; however, the tendency for formation of free ferrite at high temperatures is increased. Therefore, although molybdenum contents up to about 10% are included within the broad scope of the invention, a molybdenum content of about 4 to 6% is preferred for an optimum combination of properties. In addition to its strengthening role, molybdenum functions to increase significantly the corrosion resistance of the inventive steels in such media as chloride solutions.

Tungsten is also an effective elevated-temperature strengthener in the inventive steels. For example, a steel containing 5.11% tungsten and only 0.04% molybdenum (Steel 122) exhibited a higher creep-rupture life (782 hours) than any other steel when tested at 1100° F. under a stress of 75,000 p.s.i. (see Table V). Similarly, when tested at 1200° F. under a stress of 35,000 p.s.i., this same steel again exhibited a higher creep-rupture life (175 hours) than any other steel tested (see Table VI).

In addition to the benefits derived from the individual uses of tungsten and molybdenum, test data show that a combination of these elements is an effective strengthening agent in the inventive steels. In support thereof, it will be noted that Steel 75, containing 3.01% molybdenum and 2.35% tungsten, exhibited a creep-rupture life of 365 hours when tested at 1100° F. under a stress of 75,000 p.s.i. (see Table V).

Figure 3:
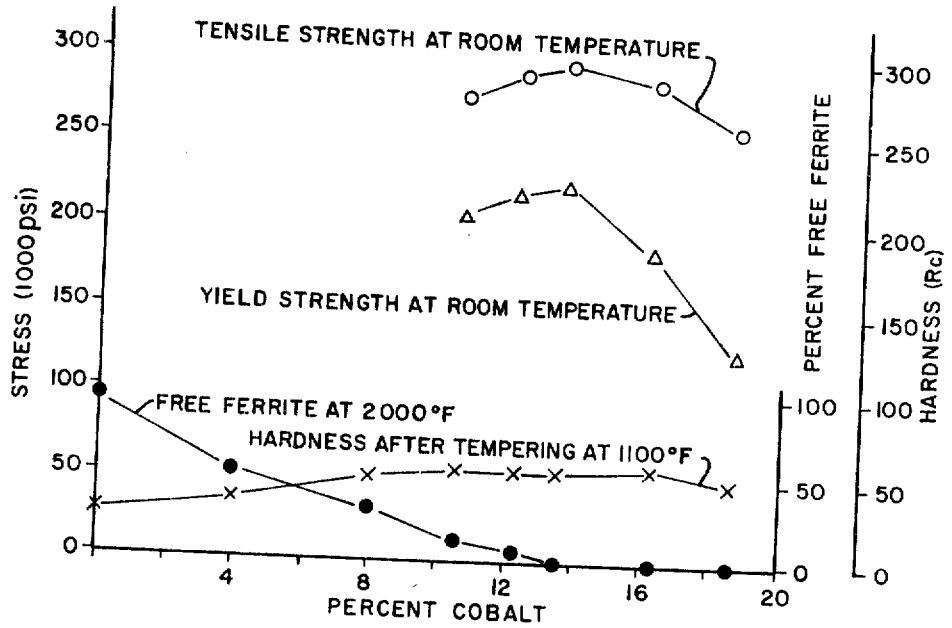
FIG. 3 shows the effect of cobalt on tensile properties, hardness and microstructure.
Figure 4:
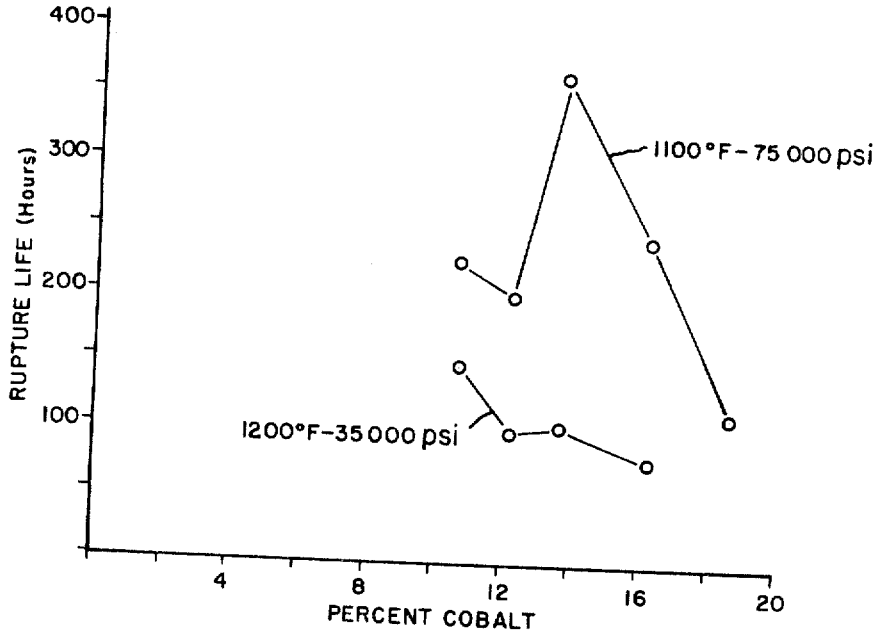
FIG. 4 shows the effect of cobalt on creep-rupture strength.

Cobalt has been incorporated as an essential ingredient in the inventive steels for the purpose of obtaining desired microstructural characteristics, a critical cobalt range of 10 to 20% having been determined therefor. In this regard, Table II strikingly reveals that cobalt values below about 10% (Steels 111, 112 and 113) result in the formation of excessive amounts of free ferrite, and that cobalt values above about 10% (Steels 76, 106, 77, 78 and 67) permit the complete or substantial elimination of free ferrite by proper compositional balance and/or heat-treatment selection. On the other hand, cobalt contents in excess of about 15% permit the retention of increasing amounts of austenite, the effect of which is to lower the room-temperature strength properties of the steels to some extent. This is graphically depicted in FIGS. 3 and 4, wherein it is observed that optimum strength values at both room temperature and 1100° F. are obtained in a cobalt range of about 13 to 15% and that said values fall off with increasing cobalt content until an extrapolated maximum of about 20% cobalt is reached, beyond which value strength properties become unsatisfactory.

In addition to the employment of a critical cobalt range, the invention contemplates as a preferred embodiment a proper balancing of the cobalt content within said range with the nitrogen content. This proper balancing, as evidenced by Steels 76, 106, 77, 78 and 67, involves the restriction of the cobalt content to values in excess of 12% where the steel is essentially nitrogen-free or low in nitrogen, i.e., less than about 0.1%. Where the nitrogen present amounts to about 0.10% or greater, the cobalt content may be lowered to the range 10 to 12%. It will be noted from Table II after an austenitizing treatment at 1900° F. that Steel 76, embraced within the broad concept of the invention, exhibits 5% free ferrite and that Steels 106, 77, 78 and 67, comprising preferred embodiments of the invention, exhibit not more than 1% free ferrite after the same austenitizing treatment.

As is known to the art, the alloying elements cobalt and nickel are interchangeable to some extent for the formation of an austenitic structure and for the elimination of free ferrite in steel. As increasing amounts of nickel up to 10.14% (Steel 118, 120 and 114) were used in the steels of this invention as a replacement for cobalt, it became evident that while nickel effectively caused the amount of free ferrite to decrease, it also stabilized the austenitic structure of the steel so that when the free ferrite was fully eliminated (as in Steel 114 containing 10.14% nickel), the steel was not hardenable and thus incapable of exhibiting very high strengths at ambient and moderately elevated temperatures. Therefore, it is recognized that although to some extent nickel may be substituted for cobalt in these steels, no complete or substantial replacement of cobalt with nickel is possible.

The elements carbon and nitrogen both constitute strong austenite formers and are essential in the steels of this invention for the elimination or minimization of free ferrite in the microstructure. Quantitatively, it appears that about 0.06 to 0.35% carbon plus nitrogen (combined) is required to avoid substantially the formation of free ferrite upon heat treatment at high temperatures. However, it is important to select quantities within the foregoing range so as to maintain a proper compositional balance vis-à-vis ferrite formers, lest the ferritizing effect of the latter become dominant. For example, where the sum of carbon plus nitrogen is less than about 0.1% the presence of vanadium (a strong ferrite former) cannot be tolerated above about 0.1%. In this regard it will be noted that Steel 121 (containing 0.068% carbon plus nitrogen and no intentionally added vanadium) was heat-treatable to zero precent free ferrite, while Steels 115 and 116 (containing 0.076% carbon plus nitrogen and 0.039% carbon plus nitrogen, respectively as well as about one-half percent each of vanadium) were heat-treatable to no less than 20% and 30% free ferrite, respectively. On the other hand, it has been found that high carbon plus nitrogen contents have an adverse effect on ductility at high strength levels and promote the retention of austenite in the microstructure. Therefore, to ensure proper compositional balance, it is preferred in the steels of this invention to keep the carbon plus nitrogen content between about 0.10% and 0.20% when the content of cobalt (as indicated heretofore, also a strong austenite former) is about 12% or higher, and between about 0.20% to 0.30% when the content of cobalt is below about 12%.

Figure 5:
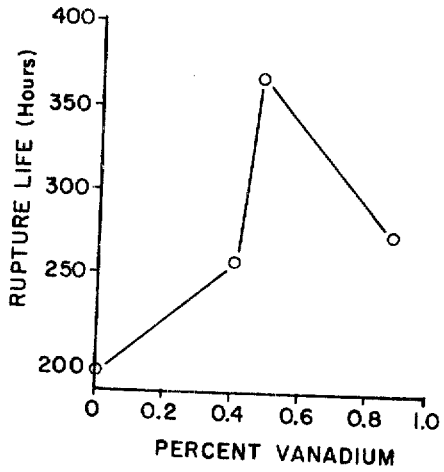
FIG. 5 shows the effect of vanadium on creep-rupture strength.

Vanadium in amounts up to about 1.0% may be added to the steels of this invention to improve certain properties. As shown in FIG. 5, additions of vanadium to the steels of the invention increased rupture life at 1100° F., as determined by creep-rupture tests, the highest rupture life being obtained with a steel containing about 0.5% vanadium.

It is generally agreed that tungsten has alloying effects in steels quite similar to those of molybdenum except that the amounts (in weight percent) necessary to produce the effects with tungsten are about twice as great as those of molybdenum because of the substantial difference in the atomic weights of these two elements. In the steels of this invention we consider tungsten as at least a partial replacement for molybdenum.

For the purpose of comparing relative strength and corrosion properties, an investigation was undertaken along these lines with respect to the steels of the invention and prior-art steels of the semiaustenitic, the 12% chromium high-strength, and the chromium hot-work tool-steel types. The nominal compositions of representative examples of the latter steel types are set forth in Table VII.

Table VII

Nominal Compositions of Comparison Steels

| Designation | C | Mn | Si | Cr | Ni | V | Mo | W | Al | N | Fe |
|---|---|---|---|---|---|---|---|---|---|---|---|
| Semiaustenitic Steels: | | | | | | | | | | | |
| AM 350 [1] | 0.10 | 1.00 | 0.40 | 16.5 | 4.25 | | 2.75 | | | | Bal. |
| AM 355 [1] | 0.15 | 1.00 | 0.40 | 15.5 | 4.25 | | 2.75 | | | 0.10 | Bal. |
| 17-7PH [2] | 0.09 | | | 17.0 | 7.1 | | | | 1.1 | | Bal. |
| PH15-7Mo [2] | 0.09 max. | 1.0 max. | 1.0 max. | 14.0-16.0 | 6.5-7.75 | | 2.0-3.0 | | 0.75-1.50 | | Bal. |
| 12% Cr High-Strength Steels: | | | | | | | | | | | |
| Crucible 422 [4] | 0.22 | 0.65 | 0.36 | 12.0 | 0.70 | 0.25 | 1.00 | 1.00 | | | Bal. |
| Crucible 422M [5] | 0.28 | 0.84 | 0.25 | 12.0 | 0.20 | 0.50 | 2.25 | 1.70 | | | Bal. |
| Lapelloy [4] | 0.30 | 1.0 | 0.25 | 12.0 | 0.30 | 0.25 | 2.75 | | | | Bal. |
| Hot-Work Steels: | | | | | | | | | | | |
| H-11 [3] | 0.38-0.43 | 0.20-0.40 | 0.80-1.00 | 4.75-5.25 | | 0.40-0.60 | 1.20-1.40 | | | | Bal. |
| Crucible 218 [5] | 0.35 | 0.35 | 1.00 | 5.00 | | 0.45 | 1.40 | | | | Bal. |

[1] Grade of Allegheny-Ludlum Steel Co.
[2] Grade of Armco Steel Co.
[3] AISI Type.
[4] Grade of General Electric Co.
[5] Grade of Crucible Steel Co. of America.

Comparative data relating to creep-rupture strength and elevated-temperature tensile strength for the steels in Table VII, representative of the types recited therein, and a sample of Steel 77, representative of the steels of the invention, are given in Tables VIII and IX, respectively.

TABLE VIII

Comparison of Creep-Rupture Strengths

| Steel | 100-Hour Creep-Rupture Strength (1,000 p.s.i.) | | | | |
|---|---|---|---|---|---|
| | 800° F. | 900° F. | 1,000° F. | 1,100° F. | 1,200° F. |
| Semiaustenitic Steels: | | | | | |
| AM 350 | 164 | 107 | 63 | | |
| 17-7PH | 110 | 78 | | | |
| PH15-7Mo | 174 | 125 | | | |
| 12% Cr High-Strength Steels: | | | | | |
| Crucible 422 | | | 63 | 46 | 25 |
| Crucible 422M | | | 86 | 61 | 26 |
| Lapelloy | | | | 50 | 28 |
| Hot-Work Steel: Crucible 218 | | 155 | 100 | 40 | |
| Steel of this Invention: | | | | | |
| Steel 77 | | | 160 | 90 | 35 |

TABLE IX

Comparison of Elevated-Temperature Tensile Strengths

| Steel | Condition | R.T. | 200° F. | 300° F. | 400° F. | 500° F. | 600° F. | 700° F. | 800° F. | 900° F. | 1,000° F. | 1,100° F. | 1,200° F. |
|---|---|---|---|---|---|---|---|---|---|---|---|---|---|
| Semiaustenitic Steels: | | | | | | | | | | | | | |
| AM-355 | SCT [1] | 222 | | 208 | 208 | | 208 | | 197 | 180 | | | |
| AM-350 | SCT | 200 | | | 185 | 191 | 179 | 190 | 179 | 165 | 105 | 68 | 45 |
| PH15-7Mo | RH950 [2] | 238 | 227 | | 211 | | 203 | | 182 | 161 | 130 | | |
| 12% Chromium High-Strength Steels: | | | | | | | | | | | | | |
| Crucible 422 | Q & T [3] | 243 | | | | | 230 | | 216 | | 169 | | 57 |
| Crucible 422M | Q & T | | | | | | | | | | | 101 | 74 |
| Hot-Work Steel: H-11 | Q & T | 280 | | | 260 | | 243 | | 230 | | 185 | 150 | 100 |
| Steel of the Invention: Steel 77 | Q & T | 290 | 286 | | | | 259 | | | 233 | 214 | 176 | 121 |

[1] Subzero-cooled and tempered.
[2] Roll-hardened at room temperature and aged 950° F.
[3] Quenched and tempered.

Figure 6:
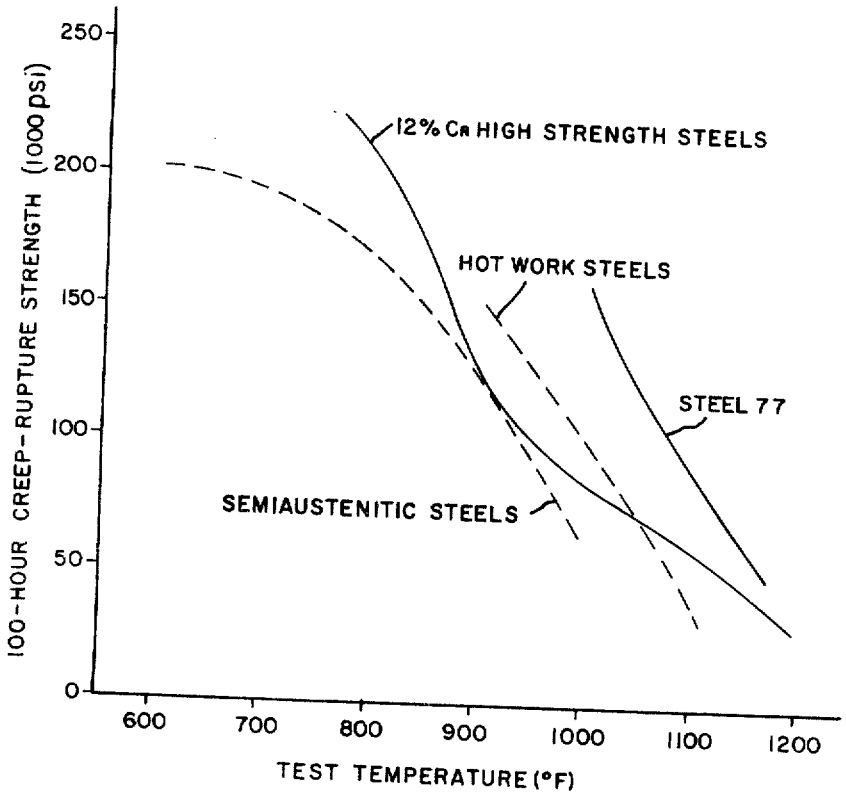
FIG. 6 shows the creep-rupture strength of various prior-art steels together with that of a steel typical of the invention.

Graphical depiction of the foregoing data is shown in FIGS. 6 and 7, wherein the superiority of the steels of the invention over the comparison steels of the prior art is clearly evident.

To assess the corrosion resistance of the steels of this invention, a heat-treated sample of Steel 77 was subjected to the water-vapor-column corrosion test and to the CASS test along with heat-treated samples of a number of the aforementioned prior-are comparison steels. These tests have been used for many years as laboratory tests to indicate the relative corrosion resistance of stainless steels under essentially atmospheric conditions.

In the water-vapor-column test, the samples are exposed to water vapor condensation for a period of 8 hours and then allowed to dry for a period of 4 hours. This procedure is repeated several times. Results of this test after six wet-and-dry cycles showed the H–11 specimen to be covered with heavy rust, and the Crucible 422 steel to contain local rust spots, whereas it showed Steel 77 of this invention to be only slightly stained, as were the samples of AM 350 and PH15–7Mo.

In the so-called CASS test, the specimens are sprayed with an acidified aqueous solution of NaCl and $CuCl_2$ for 16 hours at 120° F. The samples are then cleaned with a detergent and the surface appearance is rated by visual examination. In this test the H–11 sample was severely attacked and Crucible 422 was seriously pitted; Steel 77 along with other stainless steels showed only slight pitting and all to about the same degree.

To determine the oxidation resistance, samples of Steel 77 were exposed to a static air atmosphere at 1200° F. and measurements of weight gain were made periodically; in this test, a higher rate of weight gain indicates a higher rate of deterioration (scaling) of the steel in air at the test temperature. The results of this test, given in FIG. 8, show clearly that Steel 77 of this invention exhibited a superior resistance to oxidation attack.

For the purpose of evaluating welding characteristics of steels of the invention, welding tests were conducted on sheet samples of Steel 77 using the semiautomatic inert-gas-shielded-tungsten-arc process. The tests involved tension testing of one-eighth inch thick specimens, both welded and unwelded. The average results of these tests are given in Table X.

TABLE X

Welding test

| Condition | 0.2% Offset Yield Strength (p.s.i.) | Tensile Strength (p.s.i.) |
|---|---|---|
| Hot-rolled, 2,000° F. for 15 min., welded, −100° F. for ½ hr., 1,100° F. for 2+2 hours | 218,000 | 285,000 |
| Hot-rolled, 2,000° F. for 15 min., unwelded, −100° F. for ½ hour, 1,100° F. for 2+2 hours | 219,000 | 290,000 |

These results indicate a weld efficiency (i.e., ratio of tensile strengths of the welded specimens to those of the unwelded specimens) of 98%. Also, it is important to note that no high-temperature heat treatment is needed after the welding operation. This feature is extremely important in fabrication, since it virtually precludes any difficulties resulting from scaling and warping of a formed and welded article.

While the invention has been described and disclosed in connection with specific embodiments thereof, it will be understood that the invention is not limited thereto but may be otherwise embodied or practiced within the scope of the appended claims.

We claim:

1. A stainless steel havnig enhanced strength and useful ductility over a temperature range from subzero to about 1200° F., consisting essentially, by weight percent, of:

| Element: | Percent |
|---|---|
| Carbon+nitrogen | 0.06 to 0.35. |
| Chromium | From 11 to 16. |
| Molybdenum+½ tungsten | From 3 to less than 7. |
| Nickel | Up to 3. |
| Vandium | Up to 1. |
| Nickel+cobalt | 10 to 20. |
| Manganese | Up to 1. |
| Silicon | Up to 1. |
| Aluminum | Up to 0.25. |
| Boron | Up to 0.025. |
| Iron | Balance. |

wherein vanadium is present on the low side of its range when the sum of carbon+nitrogen is on the [high] *low* side of the combined range of those elements.

2. A stainless steel having enhanced strength and useful ductility over a temperature range from subzero to about 1200° F., consisting essentially, by weight percent, of:

| Element: | Percent |
|---|---|
| Carbon+nitrogen | 0.10 to 0.30. |
| Chromium | 12 to 16. |
| Molybdenum+½ tungsten | More than 3 to 6. |
| Nickel | Up to 3. |
| Nickel+cobalt | 12 to 16. |
| Vanadium | Up to 0.5. |
| Manganese | Up to 1. |
| Silicon | Up to 1. |
| Aluminum | Up to 0.25. |
| Boron | Up to 0.025. |
| Iron | Balance. |

where the sum of carbon+nitrogen is in the range of 0.10 to 0.20 when the sum of nickel+cobalt is at least 12% and is in the range of 0.20 to 0.30 when the sum of nickel+cobalt is less than 12%.

3. A stainless steel having enhanced strength and useful ductility over a temperature range from subzero to about 1200° F., consisting essentially, by weight percent, of:

| Element: | Percent |
|---|---|
| Carbon | 0.01 to 0.25. |
| Nitrogen | Less than 0.15. |
| Carbon+nitrogen | 0.06 to 0.35. |
| Chromium | 12 to 15.5. |
| Molybdenum+½ tungsten | 4 to 6. |
| Cobalt | 12 to 14. |
| Vanadium | Up to 0.5. |
| Manganese | Up to 0.4. |
| Silicon | Up to 0.4. |
| Aluminum | Up to 0.25. |
| Boron | Up to 0.025. |
| Iron | Balance. |

4. A heat-treated stainless steel consisting essentially of the composition of claim 1, said steel being characterized by the following minimum mechanical properties:

| | |
|---|---|
| Hardness | Rockwell "C" 48 |
| Tensile strength (room temperature) | p.s.i. 250,000 |
| Tensile strength (1100° F.) | p.s.i. 170,000 |

5. A heat-treated stainless steel consisting essentially of the composition of claim 2, said steel being characterized by the following minimum mechanical properties:

| | |
|---|---|
| Hardness | Rockwell "C" 48 |
| Tensile strength (room temperature) | p.s.i. 250,000 |
| Tensile strength (1100° F.) | p.s.i. 170,000 |

6. A heat-treated stainless steel consisting essentially of the composition of claim 3, said steel being characterized by the following minimum mechanical properties:

| | | |
|---|---|---|
| Hardness | Rockwell "C" | 48 |
| Tensile strength (room temperature) | p.s.i. | 250,000 |
| Tensile strength (1100° F.) | p.s.i. | 170,000 |

7. A heat-treated stainless steel as in claim 4, said steel being additionally characterized by the following minimum mechanical properties:

| | Hrs. |
|---|---|
| Creep-rupture life (75,000 p.s.i. at 1100° F.) | 100 |
| Creep-rupture life (35,000 p.s.i. at 1200° F.) | 50 |

8. A heat-treated stainless steel as in claim 5, said steel being additionally characterized by the following minimum mechanical properties:

| | Hrs. |
|---|---|
| Creep-rupture life (75,000 p.s.i. at 1100° F.) | 100 |
| Creep-rupture life (35,000 p.s.i. at 1200° F.) | 50 |

9. A heat-treated stainless steel as in claim 6, said steel being additionally characterized by the following minimum mechanical properties:

| | Hrs. |
|---|---|
| Creep-rupture life (75,000 p.s.i. at 1100° F.) | 100 |
| Creep-rupture life (35,000 p.s.i. at 1200° F.) | 50 |

References Cited

The following references, cited by the Examiner, are of record in the patented file of this patent or the original patent.

UNITED STATES PATENTS

| | | | |
|---|---|---|---|
| 1,357,549 | 11/1920 | Fahrenwald | 75—128 |
| 2,432,614 | 12/1947 | Franks | 75—126 |
| 2,462,665 | 2/1949 | Olcott | 75—126 |
| 2,848,323 | 8/1958 | Harris et al. | 75—126 |
| 2,880,085 | 3/1959 | Kirkby et al. | 75—126 |
| 2,990,275 | 6/1961 | Binder et al. | 75—126 |

DAVID L. RECK, *Primary Examiner.*

P. WEINSTEIN, *Assistant Examiner.*